US012627696B2

(12) United States Patent
Fridman

(10) Patent No.: US 12,627,696 B2
(45) Date of Patent: May 12, 2026

(54) IDENTITY POWER SCORING SYSTEM FOR CLOUD ENVIRONMENTS

(71) Applicant: Zscaler, Inc., San Jose, CA (US)

(72) Inventor: Aharon Fridman, Tel-Aviv (IL)

(73) Assignee: Zscaler, Inc., San Jose, CA (US)

( * ) Notice: Subject to any disclaimer, the term of this patent is extended or adjusted under 35 U.S.C. 154(b) by 238 days.

(21) Appl. No.: 17/988,184

(22) Filed: Nov. 16, 2022

(65) Prior Publication Data

US 2024/0163305 A1    May 16, 2024

(51) Int. Cl.
H04L 9/40    (2022.01)
G06F 21/33    (2013.01)

(52) U.S. Cl.
CPC .............................. H04L 63/1433 (2013.01)

(58) Field of Classification Search
CPC .................................................. H04L 63/1433
See application file for complete search history.

(56) References Cited

U.S. PATENT DOCUMENTS

| | | | |
|---|---|---|---|
| 2010/0250726 A1 | 9/2010 | Moses et al. | |
| 2017/0359220 A1* | 12/2017 | Weith .................... | G06F 16/285 |
| 2018/0027006 A1* | 1/2018 | Zimmermann ..... | H04L 63/0227 |
| | | | 726/11 |
| 2022/0046059 A1* | 2/2022 | Pandurangi ............. | H04L 63/20 |
| 2022/0067581 A1* | 3/2022 | Kumar ................... | G06N 20/20 |
| 2022/0121984 A1* | 4/2022 | Gupta ..................... | G06N 20/20 |
| 2023/0077527 A1* | 3/2023 | Sarkar ................ | G06Q 10/0635 |
| | | | 705/7.28 |

FOREIGN PATENT DOCUMENTS

EP          4293962 A1 * 12/2023    ......... H04L 63/0823

OTHER PUBLICATIONS

Muhammed Kawser Ahmed, Maximillian Panoff Kealoha, Joel Mandebi Mbongue, Sujan Kumar Saha, Erman Nghonda Tchinda, Peter Esenju Mbua, Christophe Bobda; Multi-Tenant Cloud Fpga: A Survey on Security, Trust, and Privacy; ACM Transactions on Reconfigurable Technology and Systems; Apr. 2025; pp. 1-44 (Year: 2025).*

* cited by examiner

*Primary Examiner* — Fatoumata Traore
*Assistant Examiner* — Courtney D Fields
(74) *Attorney, Agent, or Firm* — Baratta Law PLLC; Lawrence A. Baratta, Jr.; Ryan Odessa

(57)    ABSTRACT

Systems and methods for providing an identity power scoring system for cloud environments. Various embodiments include defining a plurality of admin categories associated with a cloud environment; deriving a category power score of an identity for each of the plurality of admin categories; and calculating a global power score of the identity based on the power score for each of the plurality of admin categories. The scoring system helps identify and prioritize risk associated with specific identities, allowing more optimized methods of protection for information in the cloud-based system.

20 Claims, 7 Drawing Sheets

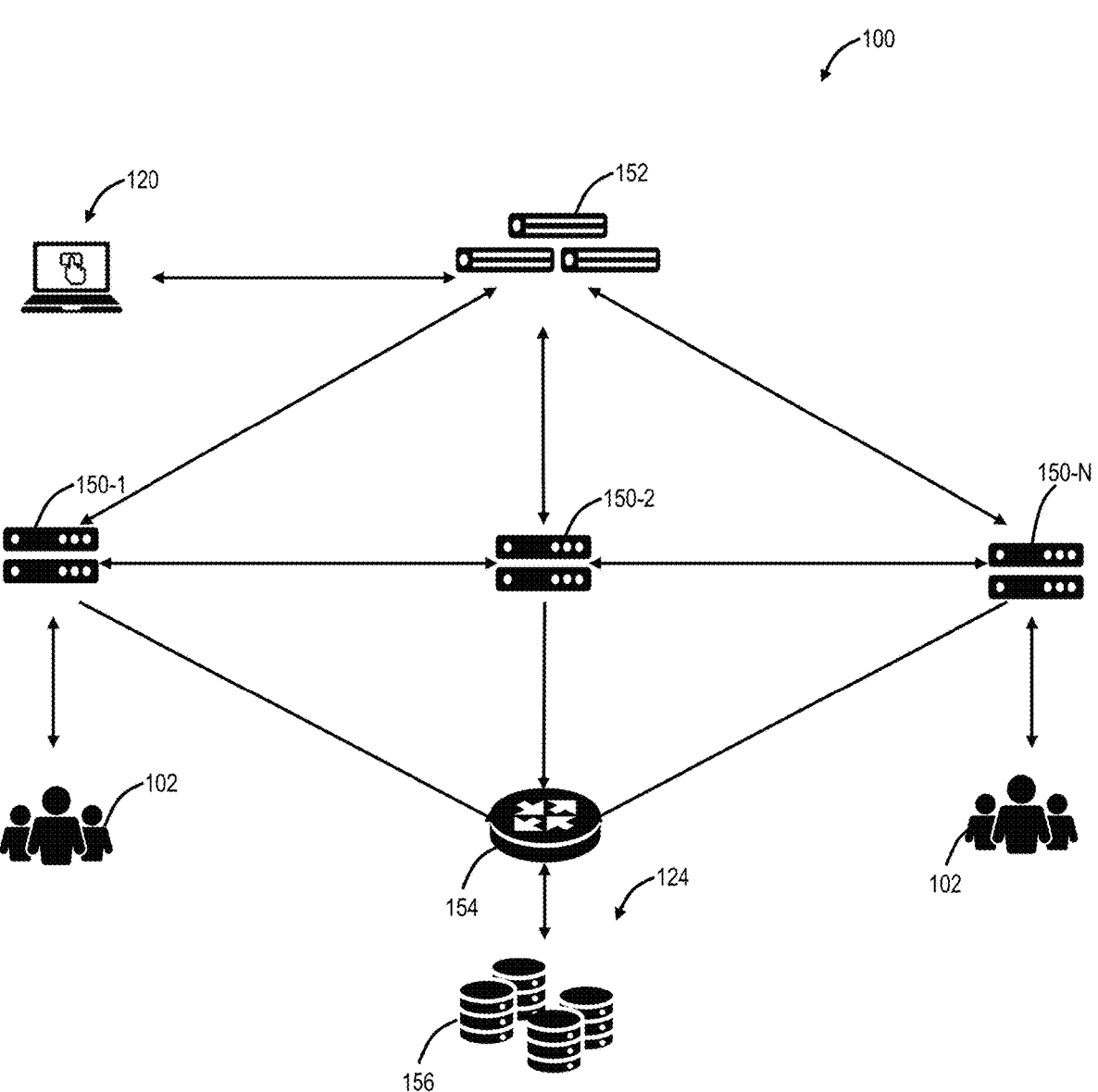
<u>FIG. 2</u>

600

602
Defining a plurality of admin categories associated with a cloud environment 604
deriving a power score of an identity for each of the plurality of admin categories 606
calculatig a global power score of the identity based on the power score for each of the plurality of admin categories

IDENTITY POWER SCORING SYSTEM FOR CLOUD ENVIRONMENTS

FIELD OF THE DISCLOSURE

The present disclosure generally relates to computer networking systems and methods. More particularly, the present disclosure relates to systems and methods for an identity power scoring system for cloud environments.

BACKGROUND OF THE DISCLOSURE

With the advent of Bring Your Own Device (BYOD) and work from home technology, there has been an explosion of mobile devices in enterprises, more specifically, in enterprise networks. It is essential for enterprises to assess risk related to exposure of such devices and user accounts. Traditionally, enterprises deploy firewalls in their on-premises networks, but now as employees have started roaming and connecting to Wi-Fi hotspots and other insecure networks, there is an emerging need to protect employee's devices that have access to sensitive enterprise information. The current disclosure aims to address security gaps through an identity power scoring system to help identify and prioritize risk related to exposure of credentials, over privileges and authentication controls.

Further, the traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA) and Zscaler Private Access (ZPA), available from Zscaler, Inc., the applicant and assignee of the present application.

ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

BRIEF SUMMARY OF THE DISCLOSURE

The present disclosure relates to systems and methods for an identity power scoring system that assigns each identity in a cloud environment or cloud-based system, human or non-human, a score of 0-100, signifying how privileged the identity is in the context of a cloud account. The scoring system helps identify and prioritize risk associated with specific identities, allowing more optimized methods of protection for information in the cloud-based system.

In various embodiments, the present disclosure includes a method with steps, a mobile device configured to implement the steps, and a non-transitory computer-readable medium storing computer-executable instructions for causing performance of the steps on a mobile device. The steps include defining a plurality of admin categories associated with a cloud environment; deriving a category power score of an identity for each of the plurality of admin categories; and calculating a global power score of the identity based on the power score for each of the plurality of admin categories.

The steps further include assessing risk associated with the cloud environment based on the global power score of the identity. The identity can be one of human or non-human. The steps can further include utilizing the global power score to provide custom rules for the identity in the cloud environment. The steps can further include assessing the severity of an incident involving the identity based on the global power score. The category power score can be based on a percentage of entitlements the identity has, in relation to all the possible entitlements in the cloud environment. The category power score can be further based on a percentage of resources the identity has access to, in relation to all resources in the cloud environment. Each of the plurality of admin categories can include a plurality of cloud services, wherein the steps can further include deriving a category power score of an identity for each of the plurality of admin categories based on one or more service scores associated with each of the plurality of admin categories. The category power scores can be derived based on a weighted system, wherein each cloud service is assigned a weight based on importance. A threshold can be defined for any category power score which causes the identity to be considered an admin in that category.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a network diagram of an example implementation of the cloud-based system.

FIG. 4 is a block diagram of a user device, which may be used with the cloud-based system or the like.

DETAILED DESCRIPTION OF THE DISCLOSURE

Again, the present disclosure relates to systems and methods for an identity power scoring system that assigns each identity in a cloud environment or cloud-based system, human or non-human, a score of 0-100, signifying how privileged the identity is in the context of a cloud account. The scoring system helps identify and prioritize risk associated with specific identities, allowing more optimized methods of protection for information in the cloud-based system.

Example Cloud-Based System Architecture

Figure 1A:
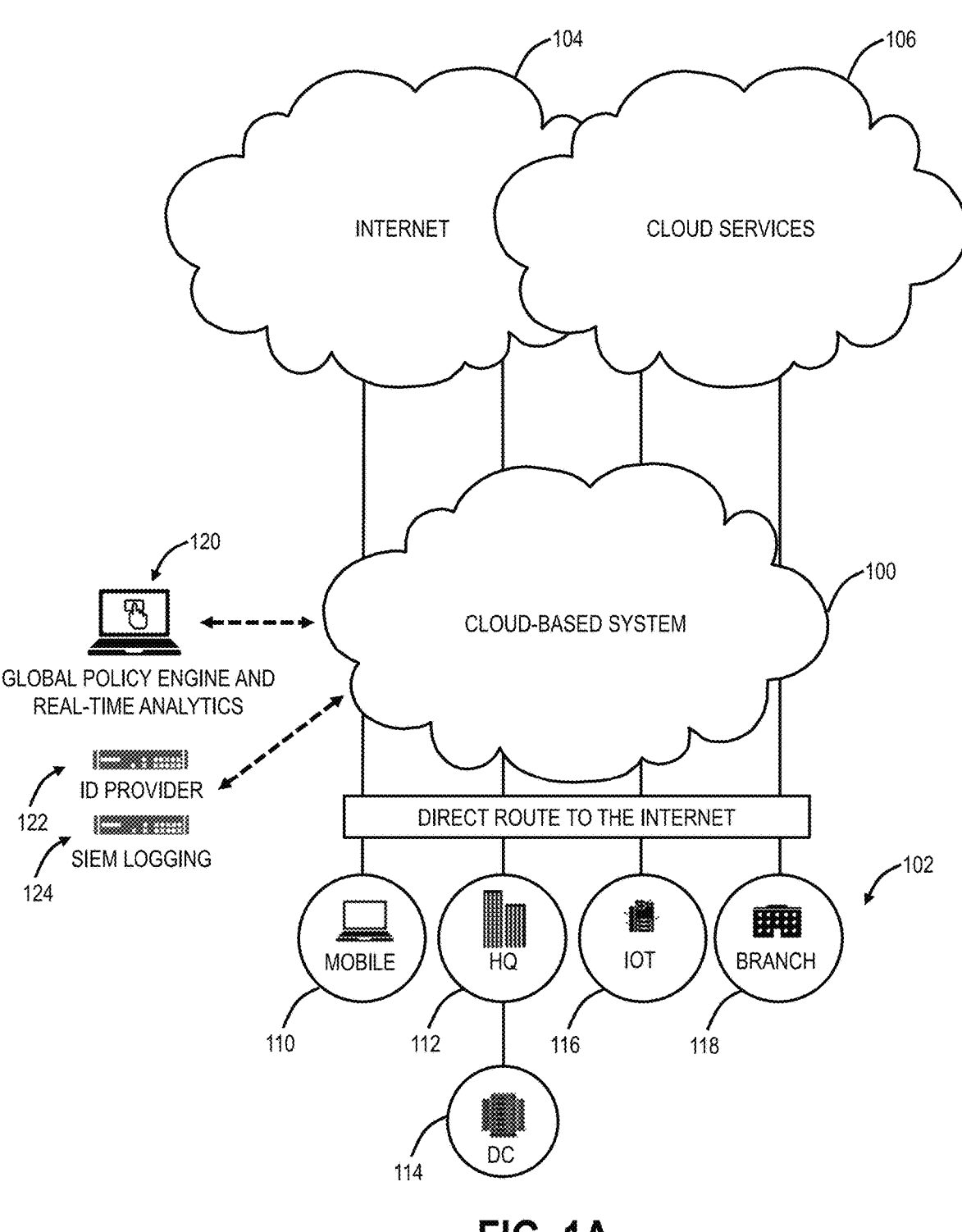
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
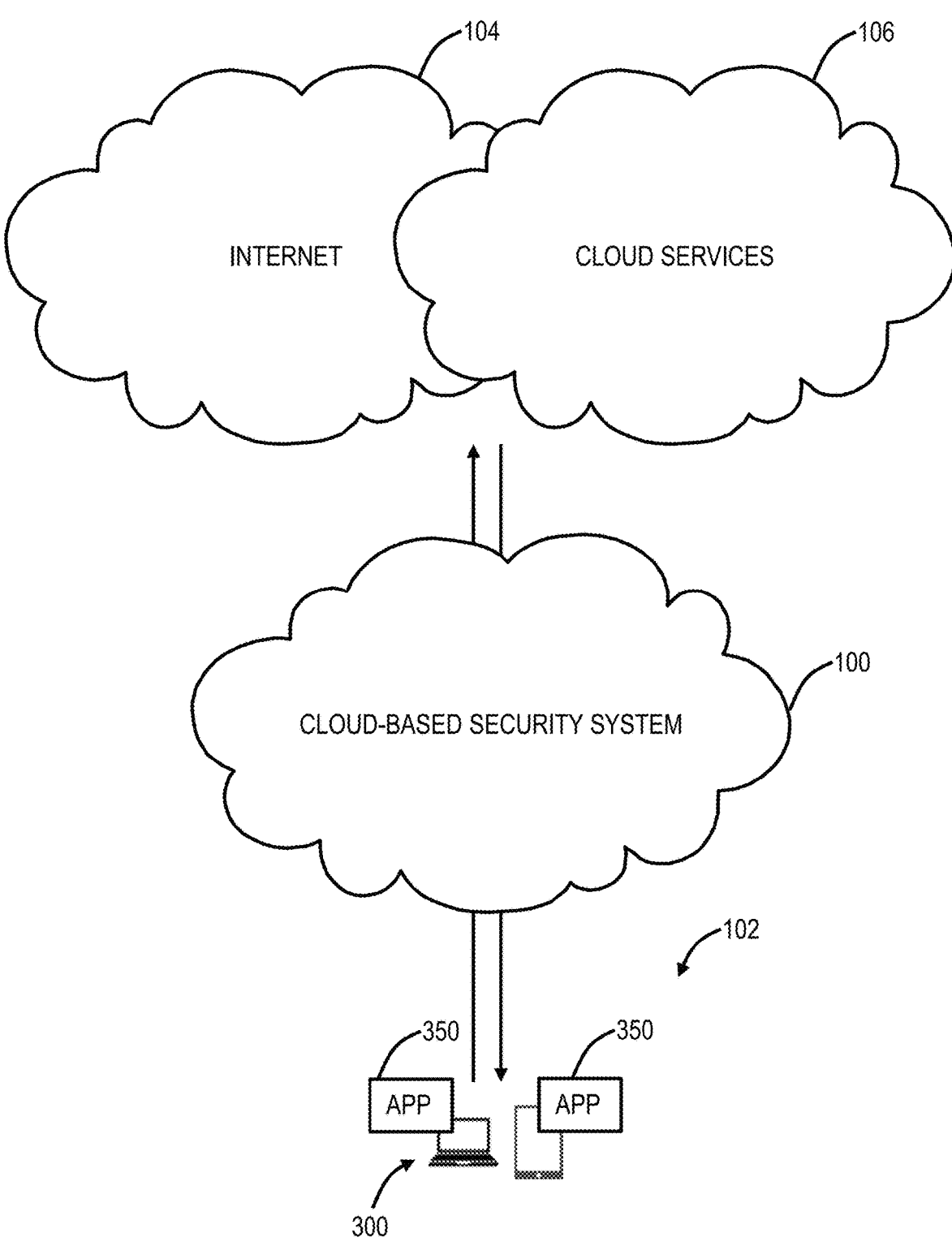
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
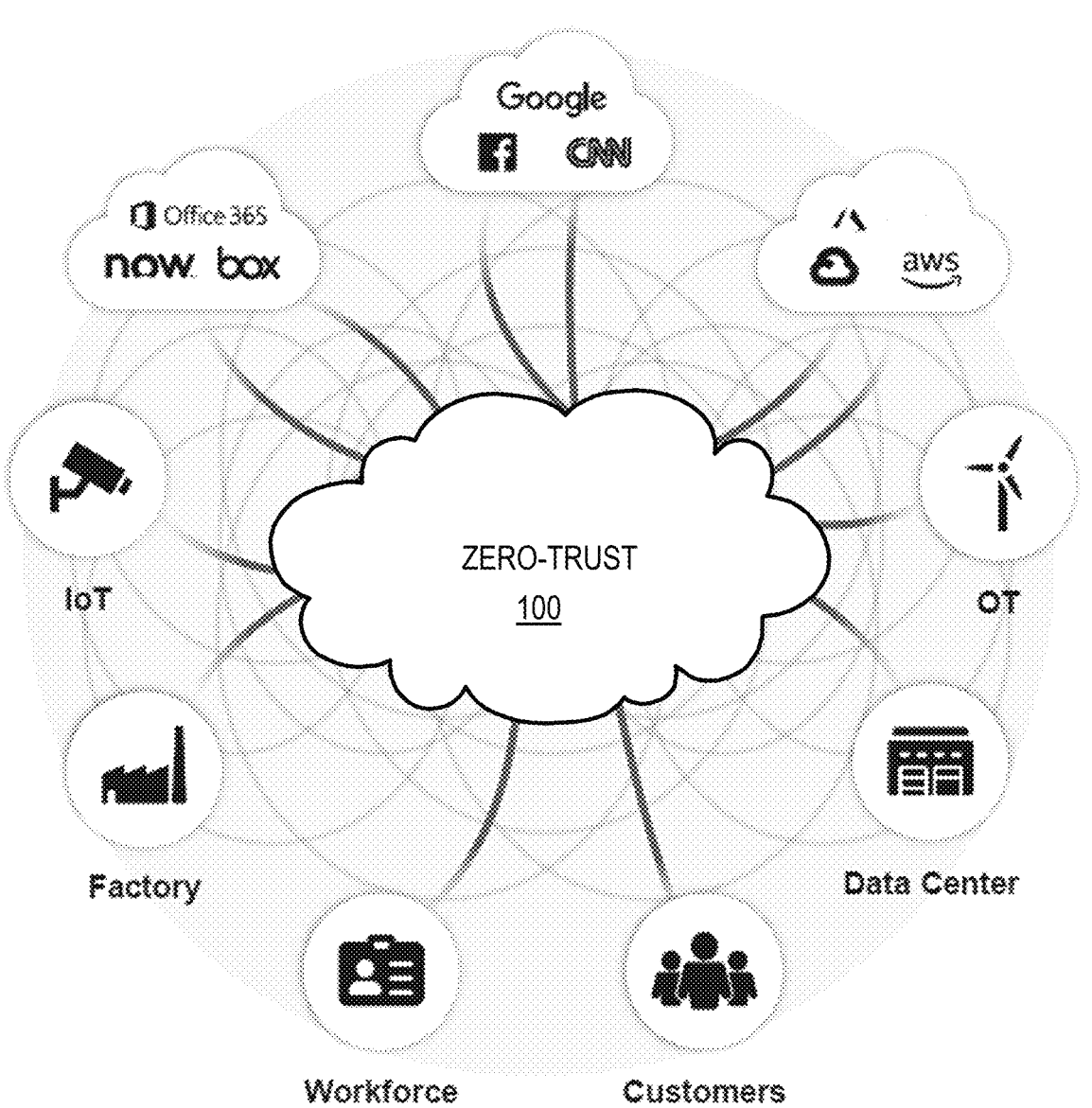
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
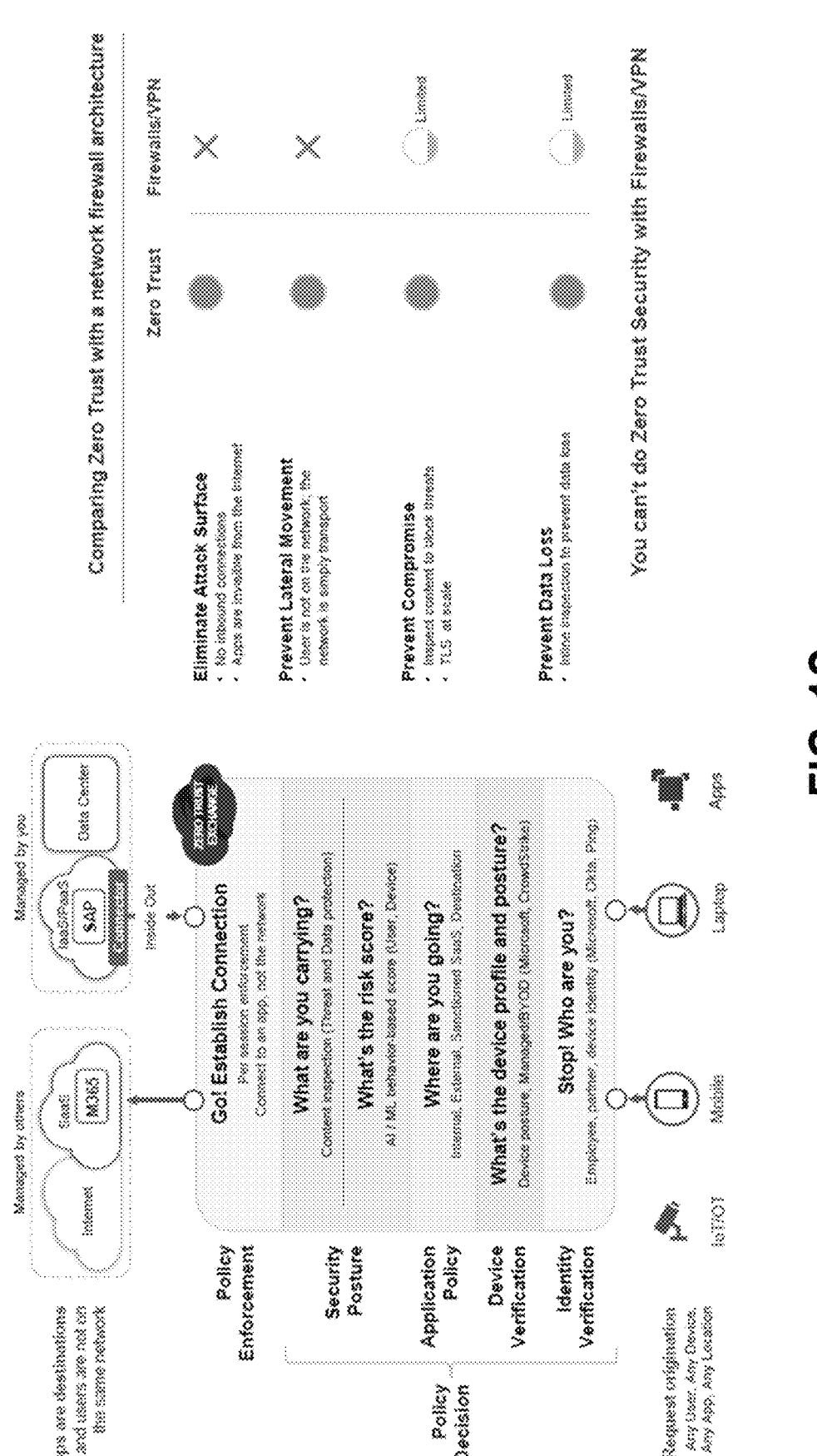
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 4:
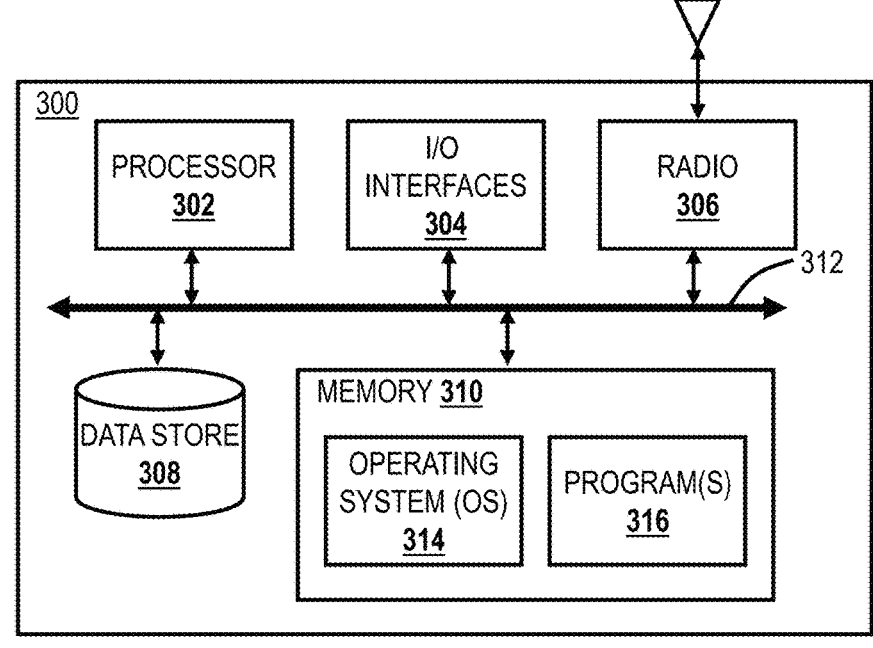

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), Zscaler Digital Experience (ZDX), Zscaler Posture Control (ZPC), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). ZPC is a Cloud-Native Application Protection Platform (CNAPP) which is a new category of security products, encompassing the functionality previously found in Cloud Security Posture Management (CSPM) and Cloud Workload Protection Platform (CWPP) products and more. Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
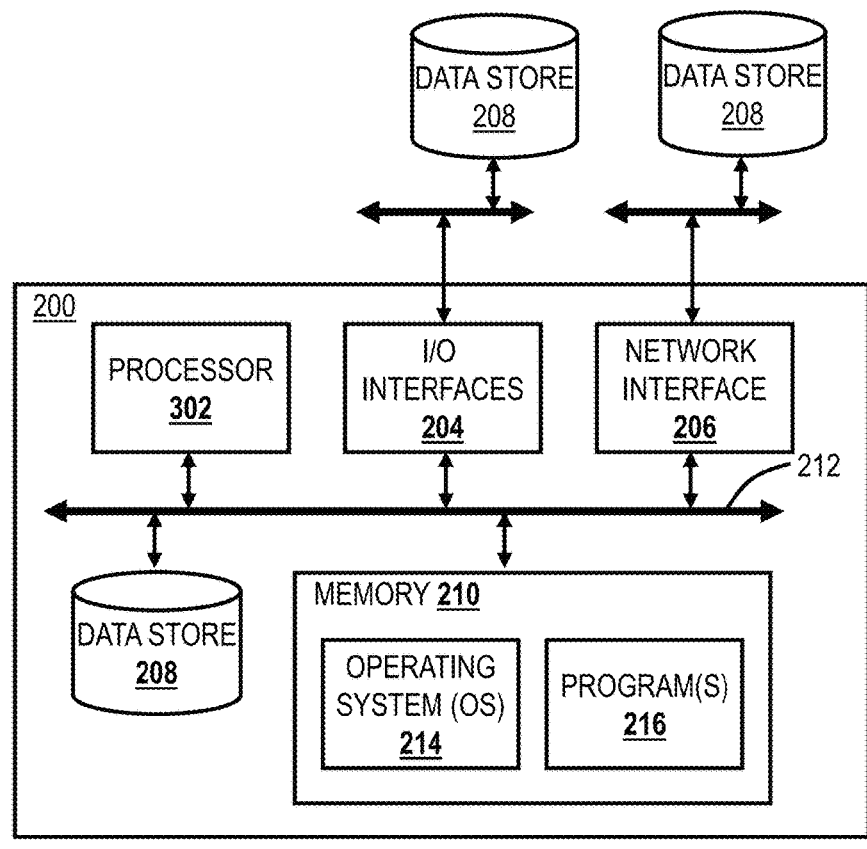
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, ZPC, etc., allowing the best in class security with zero trust access to internal apps.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

Identity Power Score

The present disclosure provides systems and methods for an identity power scoring system that assigns each identity in a cloud environment or cloud-based system, human or non-human, a score of 0-100, signifying how privileged the identity is in the context of a cloud account. The scoring system helps identify and prioritize risk associated with specific identities, allowing more optimized methods of protection for information in the cloud-based system. In addition, the identity is scored 0-100 in categories such as compute admin, secret admin, storage admin, and others of the like. it will be appreciated that the power score range can be any range, and the exemplary power score range of 0-100 is a non-limiting example.

Identities in a cloud environment or cloud-based system are varied and are used in various access scenarios, such as root accounts for extremely privileged tasks, Identity and Access Management (IAM) users with access keys for routine scripts, Elastic Compute Cloud (EC2) instances with roles, etc. Each of these identities can be assigned permissions in various different ways such as policies, group policies, inline policies, assumed roles, etc. To detect risk in a public cloud, it is critical to identify powerful users. For example, an EC2 instance that is publicly exposed and attached is a powerful role.

The scoring system helps to assess the power of an identity in the following manners. All cloud entitlements for any given identity are expended (action x resource) and calculated considering roles, policies, guardrails, deny policies, etc. Each entitlement is classified to its category such as compute, storage, etc. For each cloud account in scope, systems calculate all the possible entitlements for that account (unique action x resource pairs). Thus, the present systems and methods fully expand the span of what is possible to be done with a particular cloud account, followed by what is possible to be done by this cloud account for each category. For each identity with permissions/entitlements, systems calculate what the percentage is of the entitlements the identity has, in relation to the possible entitlements in the cloud account. This generates a value of Pe. Combining domain expertise, methods select the critical entitlements, and a result is a power score greater than or equal to the Pe value. The present disclosure enables systems to identify privileged human identities and enforce authentication controls, identify over privileged non-human identities, discover hidden admins, and govern permission drifts.

Given a customer environment with identities that have access to their cloud resources, the present systems and methods have the ability to score how powerful an identity is. This power should be expressed in a score (i.e., 0-100). For example, a global admin in Azure, or the root user in an Amazon Web Services (AWS) account, will have a score of 100. In contrast, an identity without any permissions (i.e., can only login to the console) will have a power score of 0. The purpose of this power score is to provide the score as a token that can be used in custom rules. For example, systems can define a rule that alerts to any user with score greater than 80 (or any other threshold) that is not enrolled with Multi-factor Authentication (MFA), or other security features of the like. The score can help assess the severity of an incident/risk that involves an identity. For example, the severity of old access keys for identities will depend on the identity's power score (i.e., category power score or global power score). The score also provides a way for customers to sort and view their most powerful identities. It will be appreciated that in examples such as AWS, roles can be assigned power scores in addition to identities.

Various embodiments of the present disclosure aim to help identify a risk associated with users/accounts. While "super-users" are relatively easy to detect, the range of other users in between becomes more difficult to detect/sort without understanding the context of the access. For example, data access may be critical in case of sensitive data, or almost meaningless in case of static, publicly available data. The same goes to workloads and systems. As such, given the entitlements and access of an identity, it is complicated to measure how powerful an identity is, relatively to the use case of a customer.

Various embodiments take advantage of the fact that systems/services have full visibility into the net identity's entitlements to calculate the following parameter of Pe. In short, Pe measures the percentage of entitlements an identity has, in relation to all the possible entitlements in the scope. In that context, all possible entitlements refer to all unique combinations (of action x resource) that can be found in the entitlements in that scope (ignoring grant path and identity elements). The scope can be a given service and a given category, such as a data services category, or an entire tenant (AWS account). A Pr parameter measures the percentage of resources the identity has (any) access to, in relation to all resources in the scope.

The calculation of power score for a given identity is built from the bottom up, leveraging the Pe parameter per service, in the following manner. Identities with a Pe score in the scope of the tenant which is greater than 99 are super admins with a power score of 100. Identities with a Pe score for an IAM service in the scope of the tenant greater than 99 are IAM admins with a power score of 100. For the rest of the identities, embodiments define the admin categories, for which an identity is given a category power score as detailed below. Each admin category is composed of a list of one or more relevant services. For example, data admin is composed of S3, RDS, DynamoDB, etc. Each cloud service belongs to a single admin category only, where, for each admin category, for each cloud service in that category, systems calculate a Pe score (service score) for the identity for the cloud service. For example, looking at an example identity, in the admin category of data admin, the following vector is produced [S3:80, RDS:20, DynamoDB:0, . . . ]. Various embodiments calculate a combined power score for the admin category (category power score), derived from all the Pe scores of the cloud services, in the formula detailed below. In that stage, a power score for the identity in each of the admin categories is derived. For example, an example user has the following scores for the following admin categories of Data Admin: 70, Compute Admin: 40, IAM Admin: 10, . . . etc. Systems proceed to calculate the global power score for the identity, based on the category power score for each admin category, following the formula detailed herein.

The following table provides a list of exemplary admin categories. It will be appreciated that other embodiments of the present disclosure contemplate additional admin categories.

| Category |
| --- |
| DATA_ADMIN |
| STORAGE_ADMIN |
| COMPUTE_ADMIN |
| IAM_ADMIN |
| SECURITY_ADMIN |
| INFRASTRUCTURE_ADMIN |
| CICD_ADMIN |
| SECRET_ADMIN |
| AI_ADMIN |
| LOG_ADMIN |
| APPLICATION_ADMIN |

-continued

| Category |
| --- |
| COST_ADMIN |
| OTHER |

For each identity with access in an associated scope, the following outputs are contemplated.

| Output | Meaning |
| --- | --- |
| Global Power Score | Global power score for the identity in the tenant. (0-100) |
| Admin Category Power Score Vector | For each admin category, systems output a power score for the identity, in the given admin category, (0-100). For example: Identity = ID; Data Admin: 70, Compute Admin: 40, IAM Admin: 10, . . . |
| Service Pe Value | For each cloud service, systems output for the identity the Pe value for that service in scope. (0-100) |

Combined Power Scores

Given a category, such as Data Admin, with various Pe values for its cloud services. For example, Data Admin services: [RDS:80, DynamoDB:20 Redshift:70]. Systems need to calculate the final score for the admin category of Data Admin. For that, various methods use a weighted system where each cloud service gets a weight between 0.5 to 1.5 by its importance, with a default weight of 1. The calculation for the admin category power score is as follows. For each Pe value for services in that admin category, $Pe=W*Pe$, where W is the weight for that services.

MAX_SCORE_COEFF is the coefficient given to the max score in that category.

Currently, MAX_SCORE_COEFF=0.8.

Admin category score=MAX_SCORE_COEFF*MAX(Pe Score)+(1−MAX_SCORE_COEFF)*Average(Pe Score).

Essentially, the highest Pe value of a user in a given category should elevate its score. For example, RDS full access is enough to get a score of 80 in the Data Admin category. The rest of the 20 points are determined by the average Pe value for the other services in that category.

In the above example, Pe Values=[RDS:80, DynamoDB:20 Redshift:70].

Weights=[RDS:1, DynamoDB:1 Redshift:1], the Pe values are taken as they are.

Max Pe=80 (for RDS)

Average Pe=56.6

MAX_SCORE_COEFF=0.8

Data Admin Category Power Score=0.8*80+0.2*56.6=75.32

Given the list of admin categories scores, it is desired to compose a single identity power score out of those. That score is called a global power score. To compile this score, systems follow the following logic. If a user has a high score in a single admin category, various embodiments intend to give this user a high global power score as well, since this user is powerful. Nonetheless, it is important to cap the power score of the user, given the user is an admin only in a single category. In various embodiments, an important exception is IAM, where an IAM admin is elevated to the highest global power score. In addition, if the results of the global power score is lower than the identity's global Pe value (the ratio of all identity's entitlements in the tenant, out of all possible entitlements in that tenant), systems take the maximum of the 2.

Given a list of admin category scores, the global power score is calculated with the following formula.

A threshold (THRESHOLD) is defined for any admin category score to be considered an admin in that category as: ADMIN_CATEGORY_ADMIN_THRESHOLD (current value is 80). The base global power score is defined for an identity that is admin in any category as: BASE_ADMIN_SCORE (current value is 80).

- IF IAM Admin Category score = 100:
  ○ global_power_score = 100
- ELSE
  ○ MAX_ADMIN_CATEGORY_SCORE = the highest score a user has in any admin category
  ○ IF MAX_ADMIN_CATEGORY_SCORE > ADMIN_CATEGORY_ADMIN_THRESHOLD, it means the identity has an admin category in which it is considered admin:
    ■ global_power_score = BASE_ADMIN_SCORE + (1 − (BASE_ADMIN_SCORE/100)) * AVERAGE(admin category scores)
  ○ ELSE
    ■ global_power_score = (BASE_ADMIN_SCORE/100) * MAX(admin category scores) + (1 − BASE_ADMIN_SCORE) * AVERAGE(admin category scores)
- IF global_power_score < global_Pe_value
  ○ global_power_score = global_Pe_value A query generates the base data set, for the identity power score calculation. This query returns for each tenant identity service the Pe and Pr score, along with extra stats and enrichment data.

Various embodiments go further to define priorities and weights for services that are more important. Additionally, embodiments define a set of critical actions for each service and weight the Pe accordingly.

It will be appreciated that the examples contemplated herein shall be construed as non-limiting, and various embodiments of the present disclosure are adapted to perform the methods described herein for any additional scenarios, systems, or services in order to calculate a power score. Various embodiments are also adapted to provide power scores for users, groups of users, machines, and others of the like in order to provide custom rules and policies in cloud environments. In an embodiment, the identity power scoring can be part of a CNAPP offering.

Figure 6:
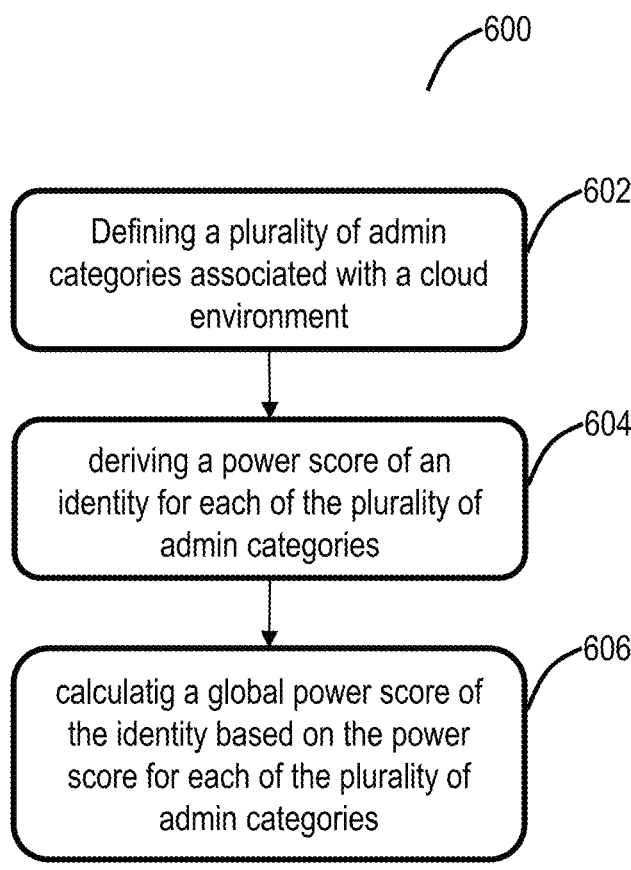
FIG. 6 is a flowchart of a process for providing an identity power scoring system for cloud environments.

FIG. 6 is a flowchart of a process 600 for providing an identity power scoring system for cloud environments. The process 600 can be performed through the cloud-based system 100. Also, the process 600 can be a computer-implemented method and as instructions stored in a non-transitory computer readable medium. The process 600 includes defining a plurality of admin categories associated with a cloud environment; deriving a category power score of an identity for each of the plurality of admin categories; and calculating a global power score of the identity based on the power score for each of the plurality of admin categories.

Various embodiments include assessing risk associated with the cloud environment based on the global power score of the identity. The identity can be one of human or non-human. The steps can further include utilizing the global power score to provide custom rules for the identity in the cloud environment. The steps can further include assessing the severity of an incident involving the identity based on the global power score. The category power score can be based on a percentage of entitlements the identity has, in relation to all the possible entitlements in the cloud environment. The category power score can be further based on a percentage of resources the identity has access to, in relation to all resources in the cloud environment. Each of the plurality of admin categories can include a plurality of cloud services, wherein the steps can further include deriving a category power score of an identity for each of the plurality of admin categories based on one or more service scores associated with each of the plurality of admin categories. The category power scores can be derived based on a weighted system, wherein each cloud service is assigned a weight based on importance. A threshold can be defined for any category power score which causes the identity to be considered an admin in that category.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A non-transitory computer-readable medium comprising instructions that, when executed, cause one or more processors of a multi-tenant, zero-trust cloud-based security system providing inline monitoring and dynamic security policy enforcement between users and cloud services to perform steps of:

defining a plurality of admin categories for identities within a tenant cloud environment, wherein each admin category is defined by a list of one or more relevant cloud services and an associated entitlement schema comprising all possible action-resource pairs representing operational privileges specific to the tenant cloud environment;

deriving a privilege-based category power score of an identity for each of the plurality of admin categories by expanding all cloud entitlements available to the identity within each admin category, wherein the entitlements comprise action-resource pairs defining specific operational permissions, and calculating a percentage representing the identity's assigned entitlements relative to all possible entitlements available in each respective admin category, wherein each category power score quantifies the extent of the identity's administrative control or privilege coverage within that admin category and is independent of risk, behavioral, or event data associated with the identity; and calculating and compiling at the cloud-based security system and responsive to real-time security policy enforcement conditions, a global power score of the identity based on weighted combination of the category power scores, wherein the global power score represents an aggregate measure of the identity's potential privilege impact across the tenant cloud environment, distinct from behavioral or risk-based scoring, and wherein the global power score dynamically and automatically adjusts zero-trust security policies governing the identity's cloud resource access in response to changes in calculated power scores.

2. The non-transitory computer-readable medium of claim 1, wherein the steps further comprise:

assessing privilege-based risk associated with the cloud environment based on the global power score of the identity.

3. The non-transitory computer-readable medium of claim 1, wherein the identity is one of human or non-human based on the global power score.

4. The non-transitory computer-readable medium of claim 1, wherein the steps further comprise:

utilizing the global power score as a token or parameter to provide custom rules or adaptive zero-trust access policies for the identity in the cloud environment.

5. The non-transitory computer-readable medium of claim 1, wherein the steps further comprise:

assessing the severity of an incident involving the identity based on the global power score.

6. The non-transitory computer-readable medium of claim 1, wherein the category power score is based on a percentage of entitlements the identity has, in relation to all the possible entitlements in the cloud environment.

7. The non-transitory computer-readable medium of claim 1, wherein the category power score is based on a percentage of resources the identity has access to, in relation to all resources in the cloud environment.

8. The non-transitory computer-readable medium of claim 1, wherein each of the plurality of admin categories includes a plurality of cloud services, and the steps further comprise:

deriving a category power score of an identity for each of the plurality of admin categories based on one or more service scores associated with each of the plurality of admin categories.

9. The non-transitory computer-readable medium of claim 8, wherein the category power scores are derived based on a weighted system, wherein each cloud service is assigned a weight based on importance.

10. The non-transitory computer-readable medium of claim 1, wherein a threshold is defined for any category power score which causes the identity to be considered an admin in that category.

11. A method, implemented by a multi-tenant, zero-trust cloud-based security system providing inline monitoring and dynamic security policy enforcement between users and cloud services, the method comprising steps of:

defining a plurality of admin categories for identities within a tenant cloud environment, wherein each admin category is defined by a list of one or more relevant cloud services and an associated entitlement schema comprising all possible action-resource pairs representing operational privileges specific to the tenant cloud environment;

deriving a privilege-based category power score of an identity for each of the plurality of admin categories by expanding all cloud entitlements available to the identity within each admin category, wherein the entitlements comprise action-resource pairs defining specific operational permissions, and calculating a percentage representing the identity's assigned entitlements relative to all possible entitlements available in each respective admin category wherein each category power score quantifies the extent of the identity's administrative control or privilege coverage within that admin category and is independent of risk, behavioral, or event data associated with the identity; and calculating and compiling at the cloud-based security system and responsive to real-time security policy enforcement conditions, a global power score of the identity based on weighted combination of the category power scores, wherein the global power score represents an aggregate measure of the identity's potential privilege impact across the tenant cloud environment, distinct from behavioral or risk-based scoring, and wherein the global power score dynamically and automatically adjusts zero-trust security policies governing the identity's cloud resource access in response to changes in calculated power scores.

12. The method of claim 11, wherein the steps further comprise:

assessing privilege-based risk associated with the cloud environment based on the global power score of the identity.

13. The method of claim 11, wherein the identity can be is one of human or non-human.

14. The method of claim 11, wherein the steps further comprise:

utilizing the global power score as a token or parameter to provide custom rules or adaptive zero-trust access policies for the identity in the cloud environment.

15. The method of claim 11, wherein the steps further comprise:

assessing the severity of an incident involving the identity based on the global power score.

16. The method of claim 11, wherein the category power score is based on a percentage of entitlements the identity has, in relation to all the possible entitlements in the cloud environment.

17. The method of claim 11, wherein the category power score is based on a percentage of resources the identity has access to, in relation to all resources in the cloud environment.

18. The method of claim 11, wherein each of the plurality of admin categories includes a plurality of cloud services, and the steps further comprise:

deriving a category power score of an identity for each of the plurality of admin categories based on one or more service scores associated with each of the plurality of admin categories.

19. The method of claim 18, wherein the category power scores are derived based on a weighted system, wherein each cloud service is assigned a weight based on importance.

20. The method of claim 11, wherein a threshold is defined for any category power score which causes the identity to be considered an admin in that category.

* * * * *